(12) United States Patent
Edvardsson et al.

(10) Patent No.: US 10,677,634 B2
(45) Date of Patent: Jun. 9, 2020

(54) RADAR LEVEL GAUGE SYSTEM HAVING LONGITUDINALLY OPEN TWO-CONDUCTOR PROBE AND METHOD OF ASSEMBLY

(71) Applicant: Rosemount Tank Radar AB, Mölnlycke (SE)

(72) Inventors: Olov Edvardsson, Linköping (SE); Håkan Fredriksson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 316 days.

(21) Appl. No.: 15/641,721

(22) Filed: Jul. 5, 2017

(65) Prior Publication Data
US 2019/0011308 A1    Jan. 10, 2019

(51) Int. Cl.
*G01F 23/284*    (2006.01)
*G01S 13/88*    (2006.01)
*G01S 13/34*    (2006.01)

(52) U.S. Cl.
CPC .......... *G01F 23/284* (2013.01); *G01S 13/343* (2013.01); *G01S 13/88* (2013.01)

(58) Field of Classification Search
None
See application file for complete search history.

(56) References Cited

U.S. PATENT DOCUMENTS

| 3,758,700 A | 9/1973 | Ditscheid |
| 2008/0078244 A1 | 4/2008 | Dietmeier |
| 2009/0293610 A1 | 12/2009 | Fauveau |
| 2010/0184326 A1 | 7/2010 | Montena |
| 2013/0009803 A1 | 1/2013 | Edvardsson |
| 2015/0377680 A1 | 12/2015 | Edvardsson et al. |
| 2017/0356783 A1 | 12/2017 | Dietmeier |

FOREIGN PATENT DOCUMENTS

| DE | 197 28 280 | 5/1998 |
| DE | 20 2008 007 989 | 12/2009 |
| DE | 10 2011 009 385 | 7/2012 |
| EP | 3 258 224 | 12/2017 |

OTHER PUBLICATIONS

Search Report from European Patent Application No. 18175090.2, dated Dec. 4, 2018.

*Primary Examiner* — Whitney Moore
(74) *Attorney, Agent, or Firm* — Westman, Champlin & Koehler, P.A.

(57) ABSTRACT

A radar level gauge system comprising a transceiver; an elongated two-conductor probe having a signal conductor connected to the transceiver, and a rigid shielding conductor spaced apart from the signal conductor by an open space. The two-conductor probe extends from an upper probe end to a lower probe end; and processing circuitry for determining the filling level based on a transmit signal and a surface echo signal. The shielding conductor exhibits an open cross-section profile, in a cross-section with a plane perpendicular to the two-conductor probe, along at least a portion of the two-conductor probe. The two-conductor probe further comprises a plurality of spacer arrangements. Each spacer arrangement includes at least a first spacer member attached to the rigid shielding conductor and arranged between the signal conductor and the rigid shielding conductor for preventing contact between the signal conductor and the shielding conductor.

16 Claims, 7 Drawing Sheets

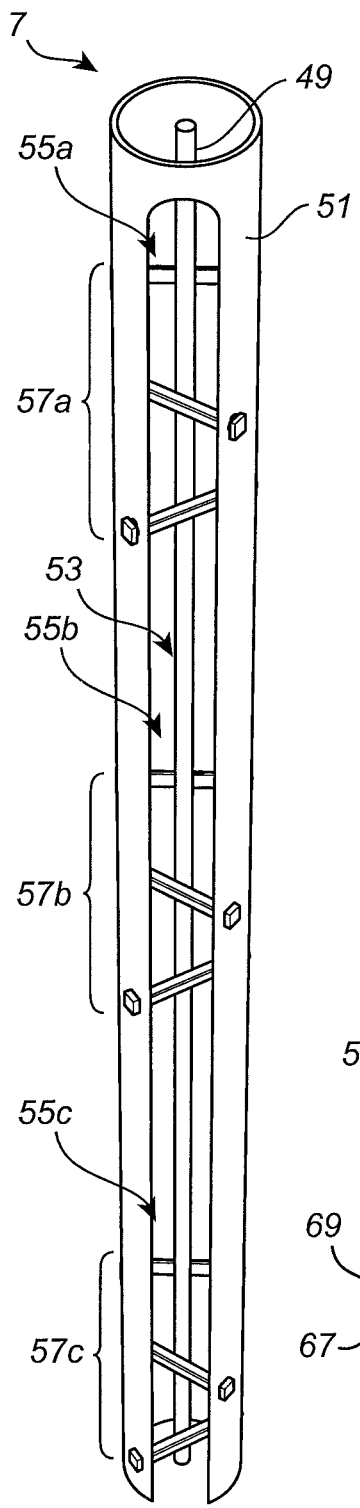
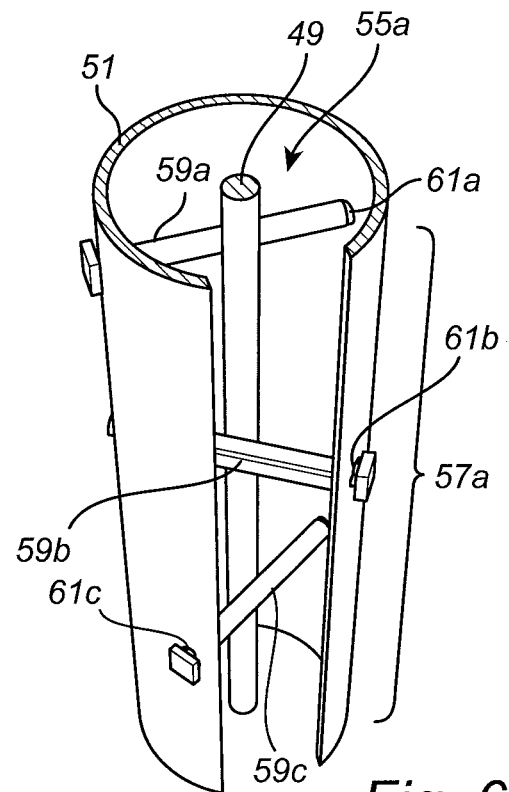
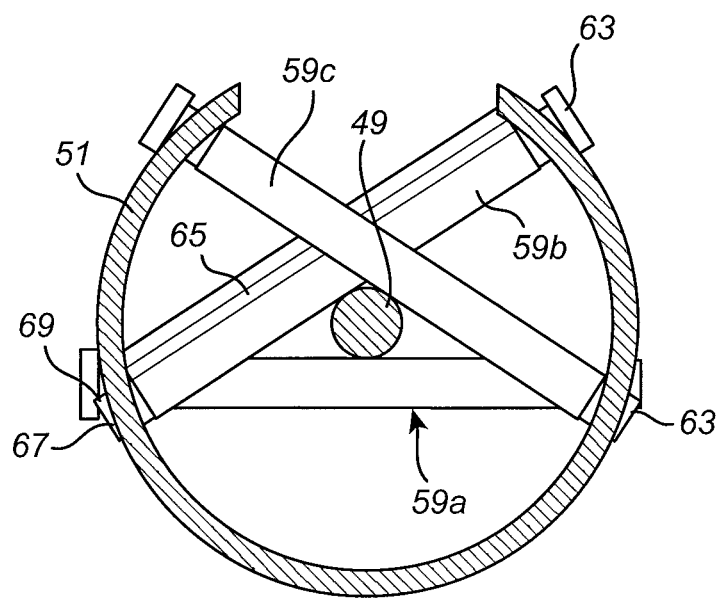
Fig. 6A
Fig. 6B
Fig. 6C

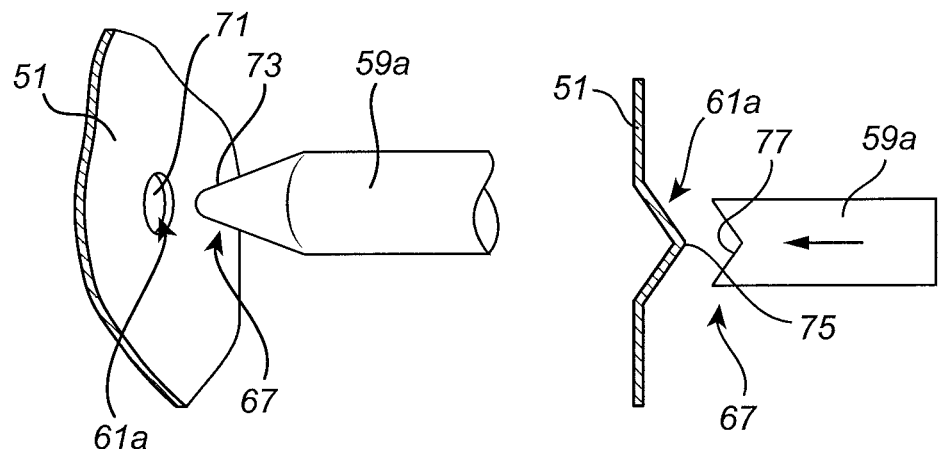
Fig. 7A    Fig. 7B
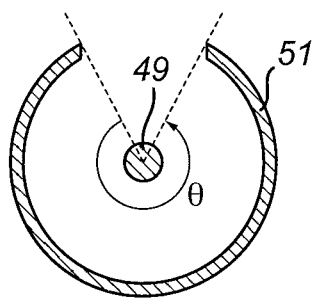
Fig. 8A
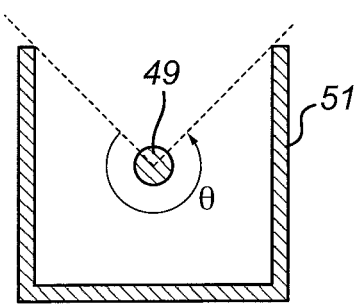    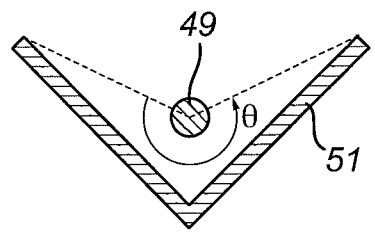
Fig. 8B    Fig. 8C

RADAR LEVEL GAUGE SYSTEM HAVING LONGITUDINALLY OPEN TWO-CONDUCTOR PROBE AND METHOD OF ASSEMBLY

TECHNICAL FIELD OF THE INVENTION

The present invention relates to a guided wave radar level gauge system with a two-conductor probe, and to a method for assembly of the two-conductor probe.

TECHNICAL BACKGROUND

Radar level gauge (RLG) systems are in wide use for determining filling levels in tanks. An electromagnetic transmit signal is generated by a transceiver and propagated towards the surface of the product in the tank, and an electromagnetic reflection signal resulting from reflection of the transmit signal at the surface is received by the transceiver.

Based on the transmit signal and the reflection signal, the distance to the surface of the product can be determined.

Most radar level gauge systems on the market today are either so-called pulsed radar level gauge systems that determine the distance to the surface of the product in the tank based on the difference in time between transmission of a pulse and reception of its reflection at the surface of the product, or systems that determine the distance to the surface based on the frequency difference between a transmitted frequency-modulated signal and its reflection at the surface. The latter type of system is generally referred to as being of the FMCW (Frequency Modulated Continuous Wave) type.

Radar level gauging is generally performed either by means of non-contact measurement, whereby electromagnetic signals are radiated towards the product in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank.

For guided wave radar level gauge systems, different kinds of probes may be used, for example depending on the characteristics of the product in the tank, or the environment in the tank.

For example, in tanks where the probe is arranged close to a wall of the tank and/or disturbing objects in the tank, it may be desirable to use a two-conductor probe in which the radial extension of the electrical field is relatively small, such as a coaxial probe with a signal conductor and a shielding conductor. In such a probe, there is generally an empty space between the signal conductor and the shielding conductor, and spacers are provided for maintaining a stable positional relationship between the signal conductor and the shielding conductor. Moreover, the shielding conductor is generally provided with holes to allow product to enter and exit the space between the signal conductor and the shielding conductor.

Although being advantageous for various applications, a coaxial probe is generally not particularly suitable for some products, such as viscous liquids which may not freely flow through the holes in the shielding conductor, or sticky liquids which may cause clogging and/or fill up the space between the signal conductor and the shielding conductor.

Furthermore, it may be cumbersome or at least time-consuming to arrange spacers for maintaining the positional relationship between the signal conductor and the shielding conductor.

It would thus be desirable to provide a guided wave radar level gauge system with an improved two-conductor probe, in particular a two-conductor probe allowing use with a broader range of products and/or facilitating the arrangement of spacers.

SUMMARY OF THE INVENTION

In view of the above, a general object of the present invention is to provide a guided wave radar level gauge system with an improved two-conductor probe, in particular a two-conductor probe allowing use with a broader range of products and/or facilitating the arrangement of spacers.

According to a first aspect of the present invention, it is therefore provided a radar level gauge system for determining a filling level of a product in a tank, the radar level gauge system comprising: a transceiver for generating, transmitting and receiving electromagnetic signals; an elongated two-conductor probe having a signal conductor connected to the transceiver, and a rigid shielding conductor spaced apart from the signal conductor by an open space, the two-conductor probe extending from an upper probe end to a lower probe end for guiding an electromagnetic transmit signal from the transceiver along the two-conductor probe towards and into the product in the tank, and for returning an electromagnetic surface echo signal resulting from reflection of the transmit signal at a surface of the product back towards the transceiver; and processing circuitry for determining the filling level based on the transmit signal and the surface echo signal, wherein the shielding conductor exhibits an open cross-section profile, in a cross-section with a plane perpendicular to the two-conductor probe, along at least a portion of the two-conductor probe; and wherein the two-conductor probe further comprises a plurality of spacer arrangements arranged in spacer regions spaced apart along the two-conductor probe, each spacer arrangement in the plurality of spacer arrangements including at least a first spacer member attached to the rigid shielding conductor and arranged between the signal conductor and the rigid shielding conductor for preventing contact between the signal conductor and the shielding conductor.

The tank may be any container or vessel capable of containing a product.

The "transceiver" may be one functional unit capable of transmitting and receiving electromagnetic signals, or may be a system comprising separate transmitter and receiver units.

The signal conductor may be essentially rigid or flexible and may be made from metal, such as stainless steel.

The shielding conductor may be made from metal, such as stainless steel. For robustness in demanding applications, the metal thickness of the shielding conductor may be at least 0.5 mm, preferably at least 1.0 mm.

Further, the cross-section profile of the shielding conductor may be rounded or polygonal.

The present invention is based on the realization that a rigid shielding conductor with an open cross-section profile can, in many application, provide for sufficient shielding to allow mounting close to a tank wall, or close to other potentially disturbing structures in the tank, while at the same time providing for less clogging and/or simplified cleaning of the probe, as well as facilitated mounting of spacers. This, in turn, allows for the use of the radar level gauge system according to embodiments of the present invention in situations where the use of shielded probes was previously not optimal or even suitable.

Advantageously, the portion of the two-conductor probe in which the shielding conductor exhibits the above-mentioned open cross-section may extend along at least one half of a distance between the upper probe end and the lower probe end. Hereby, cleaning of the two-conductor probe, as well as mounting of spacers may be facilitated.

Further, a maximum lateral dimension of the shielding conductor may be less than 5 cm, to facilitate insertion of the two-conductor probe through an existing opening in a tank wall.

According to various embodiments of the present invention, the shielding conductor may comprise at least a first spacer retaining structure in each of the spacer regions, the first spacer retaining structure being configured to co-operate with the first spacer member to attach the first spacer member to the shielding conductor in the spacer region.

Through the provision of spacer retaining structures comprised in the shielding conductor, the attachment of spacer members to the shielding conductor is facilitated, which in turn provides for a facilitated assembly of the two-conductor probe, saving precious time at installation of the radar level gauge system.

In embodiments, the first spacer retaining structure may comprise a recess, and the first spacer member may be received by the recess. For instance, the first spacer member may comprise a protrusion that is received by the recess in the shielding conductor.

Alternatively, or in combination, the first spacer retaining structure may comprise a protrusion, and the first spacer member may comprise a recess receiving the protrusion in the shielding conductor.

The above-mentioned recess in either of the shielding conductor or the first spacer member may be a blind hole or a through-going hole.

In the case of a recess comprised in the spacer retaining structure being a through-going hole, the first spacer member may be configured to be inserted into the space defined by the shielding conductor from the outside of the shielding conductor. The first spacer member and/or the spacer retaining structure may then be configured to allow locking of the first spacer member in relation to the spacer retaining structure, for instance through rotation of the first spacer member.

Alternatively, the first spacer member may be inserted into a recess comprised in the spacer retaining structure of the shielding conductor from inside the space defined by the shielding conductor. The shielding conductor may then be provided with a slit to allow the first spacer member to rotate into place, and/or the shielding conductor may be elastically deformed to allow insertion of the first spacer member. In the latter case, the shielding conductor may be allowed to spring back after insertion of the first spacer member to hold the first spacer member in position.

Spacer configurations made possible through embodiments of the present invention may be particularly advantageous in applications where a potentially electrically disturbing spacer member material may be necessary, or at least preferable. For instance, HTHP (high temperature high pressure) applications may benefit from ceramic spacers, which may result in relatively strong reflections (potentially too strong reflections) when conventional spacer configurations are used. In embodiments of the present invention, spacer members (such as ceramic spacer members) may be attached to spacer retaining structures in such a way that the signal conductor is kept in place with a very small contact area between signal conductor and spacer members. This may efficiently reduce the reflection from the spacer arrangements along the two-conductor probe.

According to embodiments, furthermore, each spacer arrangement in the plurality of spacer arrangements may include a second spacer member, different from the first spacer member, attached to the rigid shielding conductor and arranged between the signal conductor and the rigid shielding conductor for preventing, in co-operation with the first spacer member, contact between the signal conductor and the shielding conductor.

Advantageously, the shielding conductor may comprise a first spacer retaining structure and a second spacer retaining structure in each of the spacer regions, the first spacer retaining structure being configured to co-operate with the first spacer member to attach the first spacer member to the shielding conductor in the spacer region, and the second spacer retaining structure being configured to co-operate with the second spacer member to attach the second spacer member to the shielding conductor in the spacer region.

The first and second spacer retaining structures may be configured to hold the first and second spacer members, respectively, in relation to the signal conductor, in such a way that radial movement of the signal conductor in relation to the shielding conductor is restricted. To that end, the first and second spacer retaining structures may be configured to hold the first and second spacer members, respectively, at first and second positions, respectively, along the two-conductor probe, so that the first and second spacer members are longitudinally spaced apart along the two-conductor probe. In embodiments, the shielding conductor may advantageously further comprise a third spacer retaining structure in the spacer region, to further restrict the radial movement of the signal conductor in relation to the shielding conductor.

In embodiments, furthermore, the signal conductor may be arranged between the first spacer member and the second spacer member.

In embodiments, the first spacer retaining structure may comprise a recess, and the first spacer member may be received by the recess; and the second spacer retaining structure may comprise a recess, and the second spacer member may be received by the recess.

Alternatively, or in combination, the first spacer retaining structure may comprise a protrusion, and the first spacer member may comprise a recess receiving the protrusion; and the second spacer retaining structure may comprise a protrusion, and the second spacer member may comprise a recess receiving the protrusion.

To provide for an advantageous combination of electrical shielding, in situ cleanability, and ease of spacer arrangement, the shielding conductor may surrounds the signal conductor by an enclosing arc angle around the signal conductor greater than 180° and less than 330° along the portion of the two-conductor probe.

According to embodiments, furthermore, the open cross-section profile of the shielding conductor may be substantially uniform along the portion of the two-conductor probe, to reduce variations in electrical properties along the two-conductor probe.

According to a second aspect of the present invention, it is provided a method for assembly of a two-conductor probe for a radar level gauge system, the method comprising the steps of: providing an elongated shielding conductor exhibiting an elongated opening along at least a portion of the shielding conductor; providing an elongated signal conductor to be at least partly enclosed by the shielding conductor; providing at least one spacer arrangement; arranging the at least one spacer arrangement between the signal conductor and the shielding conductor to prevent contact between the signal conductor and the shielding conductor; and attaching the at least one spacer arrangement to the shielding conductor.

According to embodiments, the at least one spacer arrangement may comprise at least a first spacer member; and the step of arranging the at least one spacer arrangement may comprise the step of: inserting the at least first spacer member into the shielding conductor through the elongated opening in the shielding conductor.

Further variations and advantages of the present second aspect of the invention are analogous to those described above in connection with the first aspect of the invention.

In summary, the present invention thus relates to a radar level gauge system comprising a transceiver; an elongated two-conductor probe having a signal conductor connected to the transceiver, and a rigid shielding conductor spaced apart from the signal conductor by an open space. The two-conductor probe extends from an upper probe end to a lower probe end; and processing circuitry for determining the filling level based on a transmit signal and a surface echo signal. The shielding conductor exhibits an open cross-section profile, in a cross-section with a plane perpendicular to the two-conductor probe, along at least a portion of the two-conductor probe. The two-conductor probe further comprises a plurality of spacer arrangements. Each spacer arrangement includes at least a first spacer member attached to the rigid shielding conductor and arranged between the signal conductor and the rigid shielding conductor for preventing contact between the signal conductor and the shielding conductor.

BRIEF DESCRIPTION OF THE DRAWINGS

These and other aspects of the present invention will now be described in more detail, with reference to the appended drawings showing example embodiments of the invention, wherein:

FIG. 6A schematically shows a first example configuration of the two-conductor probe comprised in the radar level gauge system in FIG. 1;

FIG. 6B is an enlarged view of a spacer region of the two-conductor probe in FIG. 6A;

FIG. 6C is a view from above of the spacer region in FIG. 6B;

FIG. 7A schematically shows a first configuration of a spacer retaining structure;

FIG. 7B schematically shows a second configuration of a spacer retaining structure;

FIGS. 8A-C are schematic cross-section views of two-conductor probes according to different embodiments;

DETAILED DESCRIPTION OF AN EXAMPLE EMBODIMENT OF THE INVENTION

In the present detailed description, various embodiments of the present invention are mainly discussed with reference to an FMCW-type radar level gauge system.

It should be noted that this by no means limits the scope of the present invention, which also covers a pulsed radar level gauge system.

Figure 1:
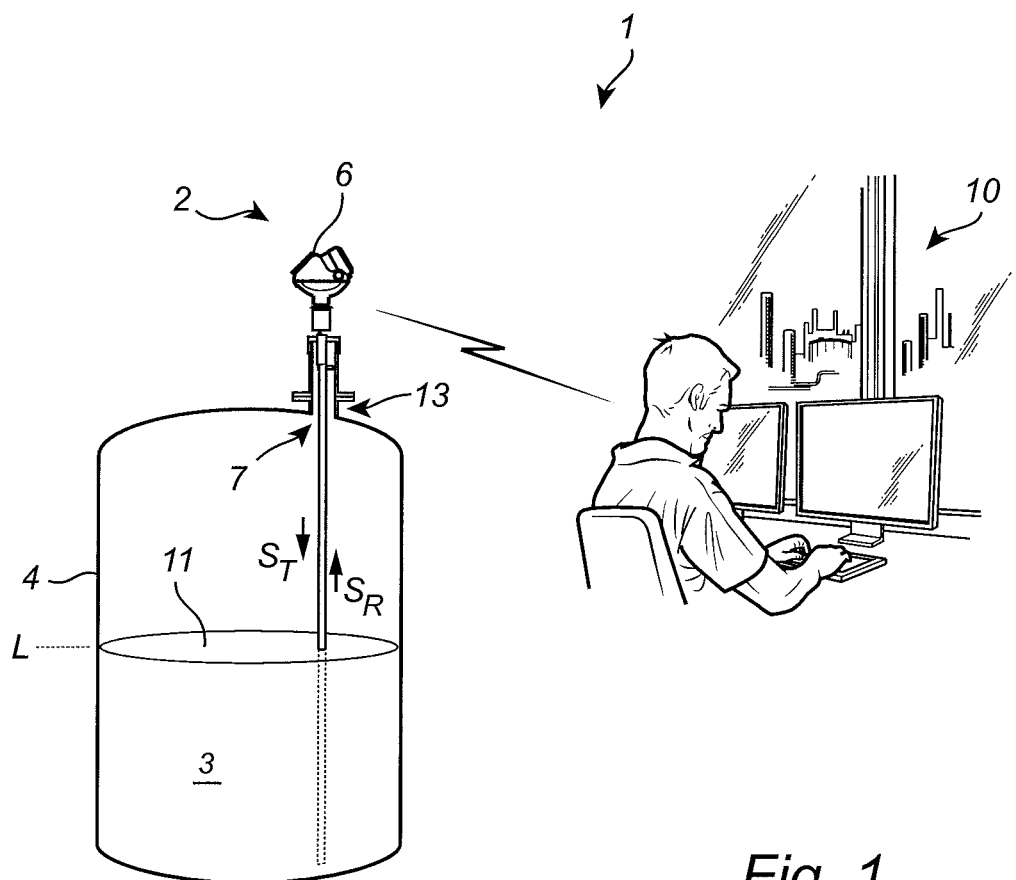
FIG. 1 schematically illustrates an exemplary tank arrangement comprising a radar level gauge system according to an embodiment of the present invention.

FIG. 1 schematically shows a level measuring system 1 comprising a radar level gauge system 2 according to an example embodiment of the present invention, and a host system 10 illustrated as a control room.

The radar level gauge system 2 of GWR (Guided Wave Radar) type is installed at a tank 4 having a tubular mounting structure 13 (often referred to as a "nozzle") extending substantially vertically from the roof of the tank 4.

The radar level gauge system 2 is installed to measure the filling level of a product 3 in the tank 4. The radar level gauge system 2 comprises a measuring unit 6 and a propagation device in the form of probe 7 extending from the measuring unit 6, through the tubular mounting structure 13, towards and into the product 3. In the example embodiment in FIG. 1, the probe 7 is a longitudinally open two-conductor probe. Configurations of the probe 7 will be described in greater detail further below.

By analyzing transmitted signals $S_T$ being guided by the probe 7 towards the surface 11 of the product 3, and reflected signals $S_R$ traveling back from the surface 11, the measurement unit 6 can determine the filling level of the product 3 in the tank 4. It should be noted that, although a tank 4 containing a single product 3 is discussed herein, the distance to any material interface along the probe can be measured in a similar manner.

The radar level gauge system in FIG. 1 will now be described in more detail with reference to the schematic block diagram in FIG. 2.

Using the radar level gauge system according to various embodiments of the present invention, the time-of-flight is determined based on the phase difference between the phase-modulated transmit signal and the surface reflection signal. This type of measurement scheme is often generally referred to as FMCW (Frequency Modulated Continuous Wave).

Figure 2:
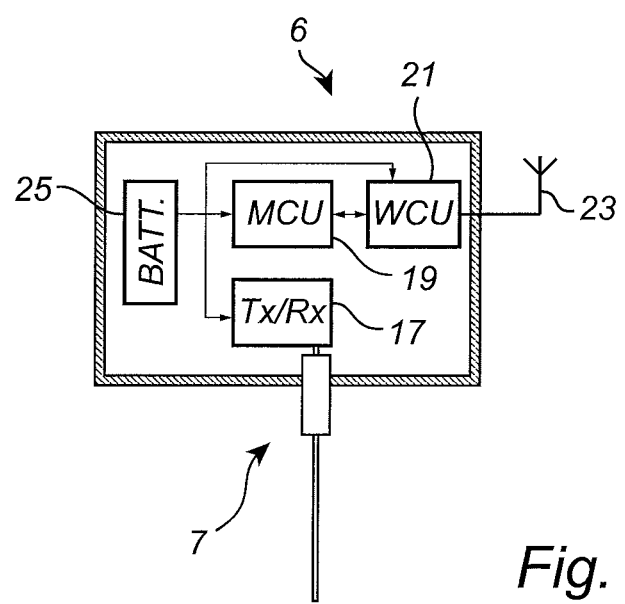
FIG. 2 is schematic illustration of the measurement unit comprised in the radar level gauge system in FIG. 1.

Referring to the schematic block diagram in FIG. 2, the measurement unit 6 of the radar level gauge system 2 in FIG. 1 comprises a transceiver 17, a measurement control unit (MCU) 19, a wireless communication control unit (WCU) 21, a communication antenna 23, and an energy store, such as a battery 25.

As is schematically illustrated in FIG. 2, the MCU 19 controls the transceiver 17 to generate, transmit and receive electromagnetic signals. The transmitted signals pass to the probe 7, and the received signals pass from the probe 7 to the transceiver 17.

The MCU 19 determines the filling level of the product 3 in the tank 4 based on the phase difference between the transmit signal $S_T$ and the reflected signal $S_R$. The filling level is provided to an external device, such as a control center from the MCU 19 via the WCU 21 through the communication antenna 23. The radar level gauge system 1 may advantageously be configured according to the so-called WirelessHART communication protocol (IEC 62591).

Although the measurement unit 6 is shown to comprise an energy store 25 and to comprise devices (such as the WCU 21 and the communication antenna 23) for allowing wireless communication, it should be understood that power supply and communication may be provided in a different way, such as through communication lines (for example 4-20 mA lines).

The local energy store need not only comprise a battery, but may alternatively, or in combination, comprise a capacitor or super-capacitor.

The radar level gauge system 2 in FIG. 1 will now be described in greater detail with reference to the schematic block diagram in FIG. 3.

Figure 3:
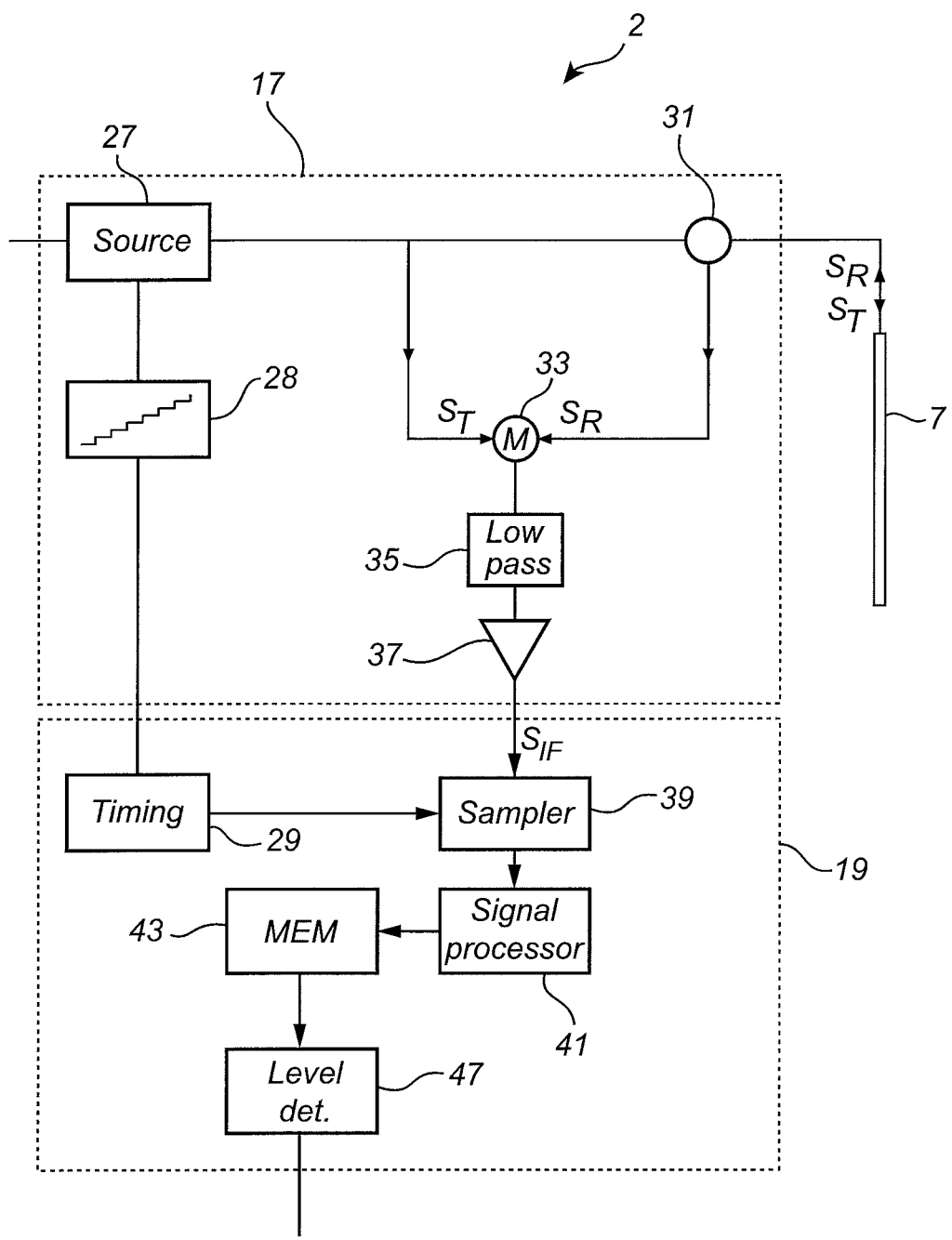
FIG. 3 is a schematic block diagram of a radar level gauge system according to an embodiment of the present invention.

Referring now to FIG. 3, there is shown a more detailed block diagram of the transceiver 17 and MCU 19 in FIG. 2.

The transceiver 17 here includes a microwave source 27 driven by a step generator 28, in turn controlled by timing circuitry 29 forming part of the MCU 19. The microwave source 27 is connected to the probe 7 via a power divider 31. The power divider 31 is arranged to connect a return signal from the probe 7 to a mixer 33, which is also connected to receive the signal from the microwave source 27. The mixer output is connected to a low pass filter 35 and an amplifier 37.

The processing circuitry 19 here includes, in addition to the timing circuitry 29 mentioned above, a sampler 39 configured to receive and sample the intermediate frequency signal $S_{IF}$ output by the mixer 33, low pass filtered by the low pass filter 35 and amplified by the amplifier 37. The sampler 39 may, for example, comprise a sample-and-hold circuit in combination with an A/D-converter, or be realized as a sigma-delta converter. The sampler 39 is controlled by the timing circuitry to be synchronized with the transmit signal $S_T$. The MCU 19 further includes a signal processor 41, a memory 43, and a level determinator 47.

While the elements of the transceiver 17 are typically implemented in hardware, and form part of an integrated unit normally referred to as a microwave unit, at least some portions of the MCU 19 may typically be embodied by software modules executed by an embedded processor. The invention is not restricted to this particular realization, and any implementation found suitable to realize the herein described functionality may be contemplated.

Figure 4:
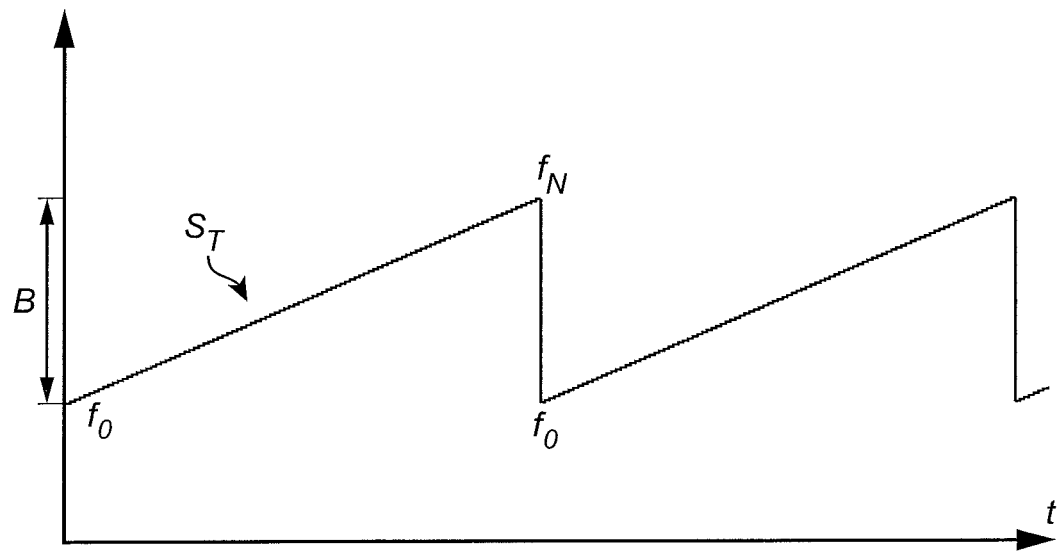
FIG. 4 schematically illustrates an example of a transmit signal transmitted by the transceiver in a radar level gauge system according to an embodiment of the invention.

With reference to FIG. 3, the timing circuitry 29 controls the microwave source 27 via the step generator 28 for form the transmit signal $S_T$. Referring to FIG. 4, the transmit signal $S_T$ is provided in the form of a time sequence $f_0$-$f_N$ of a number of discrete and mutually different frequencies $f_n$. As is schematically indicated in FIG. 4, the discrete and mutually different frequencies $f_0$-$f_N$ define a bandwidth B. In this particular example, the frequencies adjacent in terms of frequency are also adjacent in the time sequence, but this is not necessarily the case. Alternatively, the discrete and mutually different frequencies may be output in an arbitrary but known order.

The reflection signal $S_R$ results from reflection of the transmit signal $S_T$ at impedance discontinuities (including the surface 11 indicated in FIG. 1). Due to the time-of-flight from the radar level gauge system to the different impedance discontinuities and back, the reflection signal $S_R$ will be a delayed copy of the transmit signal $S_T$, where the portions of the reflection signal $S_R$ reflected from the different impedance discontinuities will exhibit different phase differences as compared to the transmit signal $S_T$. The phase differences will, furthermore, change in steps with the changes in transmitted discrete frequency $f_n$.

Figure 5:
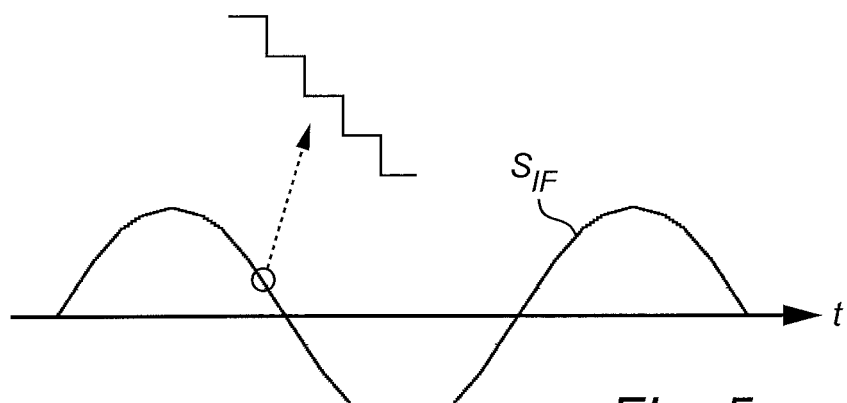
FIG. 5 is a diagram showing the intermediate frequency signal resulting from the transmit signal.

An intermediate frequency signal $S_{IF}$ is formed by combining the transmit signal $S_T$ and the reflection signal $S_R$ in the mixer 33. The intermediate frequency signal $S_{IF}$ is schematically shown in FIG. 5.

If a transmit signal with a continuously varying frequency had been used, the intermediate frequency signal would have been a continuous signal comprising one frequency component for each time-of-flight corresponding to the different impedance discontinuities encountered by the transmit signal.

Since the transmit signal $S_T$ is instead a sequence of discrete frequencies $f_n$, the phase difference will vary in steps, which means that the intermediate frequency signal $S_{IF}$ will be piece-wise constant with the same duration of the constant portions as the duration of transmission of the different frequencies $f_n$ of the transmit signal $S_T$. This is schematically indicated in FIG. 5.

The intermediate frequency signal $S_{IF}$, which has been sampled by the sampler 39 in FIG. 3 is processed by the signal processor 41 in order to determine a data set indicative of surface echo candidates. The intermediate frequency signal $S_{IF}$ in FIG. 5 is first transformed from the time domain to the frequency domain using, for example, FFT (Fast Fourier Transform). Following transformation to the frequency domain of the intermediate frequency signal $S_{IF}$, the resulting frequency spectrum is transformed to an echo curve, which is used by the level determinator 47 to determine the filling level of the product 3 in the tank 4.

A first example configuration of the two-conductor probe 7 comprised in the radar level gauge system 2 in FIG. 1 will now be described with reference to FIG. 6A. As is schematically shown in FIG. 6A, the two-conductor probe 7 comprises a signal conductor 49 and a shielding conductor 51. As is indicated in FIG. 6A, the shielding conductor 51 has a longitudinal opening 53 extending along a portion of the two-conductor probe 7. The two-conductor probe 7 further comprises a plurality of spacer arrangements 55a-c arranged in spacer regions 57a-c spaced apart along the two-conductor probe 7. An example of these spacer arrangements 55a-c will be described in greater detail below, with reference to FIG. 6B and FIG. 6C.

Referring now to FIG. 6B, which is an enlarged view of the first spacer region 57a of the two-conductor probe 7, the spacer arrangement 55a comprises first, second, and third spacer members, here in the form of first 59a, second 59b, and third 59c ceramic pins, and the shielding conductor 51 comprises first, second, and third spacer retaining structures, here in the form of first 61a, second 61b, and third 61c sets of holes in the shielding conductor 51 (only one hole in each set of holes is indicated by reference numerals in FIGS. 6B and 6C to avoid cluttering the drawings).

With reference also to FIG. 6C, which is a view from above of the first spacer region 57a, each of the first 59a, second 59b, and third 59c spacer member comprises a head 63, a body 65, and a tip 67. In FIG. 6C, these portions of each spacer member is only indicated with reference numerals for the first spacer member 59b, to avoid cluttering the drawings. As is schematically indicated in FIG. 6C, the tip 67 of the spacer member 59b includes a radial protrusion 69. To attach the spacer member 59b to the shielding conductor 51 (restrict movement of the spacer member 59b in relation to the shielding conductor), the holes 61b may be configured to allow the spacer member 59b, including the radial protrusion 69 of the tip 67 to pass through the holes 61b in one rotational state only, allowing the spacer member 59b to be locked in place through rotation around its longitudinal axis. The same is, of course, true also for the first 59a and third 59c spacer members.

As is clear from FIG. 6B and FIG. 6C, spacer retaining structures 61a-c thus co-operate with their respective spacer members 59a-c to attach the spacer members 59a-c to the shielding conductor 51 in the spacer region 57a to prevent contact between the signal conductor 49 and the shielding conductor 51. Further, the spacer arrangements 55a-c are thus configured to do so with only minimal contact between the spacer members 59a-c and the signal conductor.

Obviously, the spacer member 59a-c and the spacer retaining structures 61a-c may have different configurations than indicated in FIGS. 6A-C. According to a first example, schematically illustrated in FIG. 7A, the spacer retaining structures 61a-c may be sets of blind holes 71, and the tips 67 of the spacer members 59a-c may comprise axial protrusions 73 configured to fit in the blind holes 71 of the spacer retaining structures 61a-c. Naturally, the axial protrusions 73 of the spacer members 59a-c may equally well co-operate with through-going holes, such as those shown in FIGS. 6A-C. According to a second example, schematically illustrated in FIG. 7B, the spacer retaining structures 61a-c may be sets of protrusions 75, and the tips 67 of the spacer members 59a-c may comprise axial recesses 77 configured to receive the protrusions 75 of the spacer retaining structures 61a-c. Naturally, the axial recesses 77 of the spacer members 59a-c need not be conical, but may equally well be blind holes or through-going holes (axially going through the entire spacer member 59a) with a circular cross-section.

Having now explained some different possible configurations of the spacer members 59a-c and the spacer retaining structures 61a-c, it should also be pointed out that the shielding conductor 51 may have various different cross-section profiles, as long as the cross-section profile is open along at least a portion of the two-conductor probe 7.

Referring first to FIG. 8A, which corresponds to the probe configuration in FIGS. 6A-C, it is indicated that the shielding conductor 51 surrounds the signal conductor 49 by an enclosing arc angle θ around the signal conductor 49. In FIG. 8A, the shielding conductor 51 has a generally circular cross-section.

In FIG. 8B, the shielding conductor 51 has the outline of three sides of a rectangle, and in FIG. 8C, the shielding conductor 51 has the outline of two sides of a rectangle.

Figure 9:
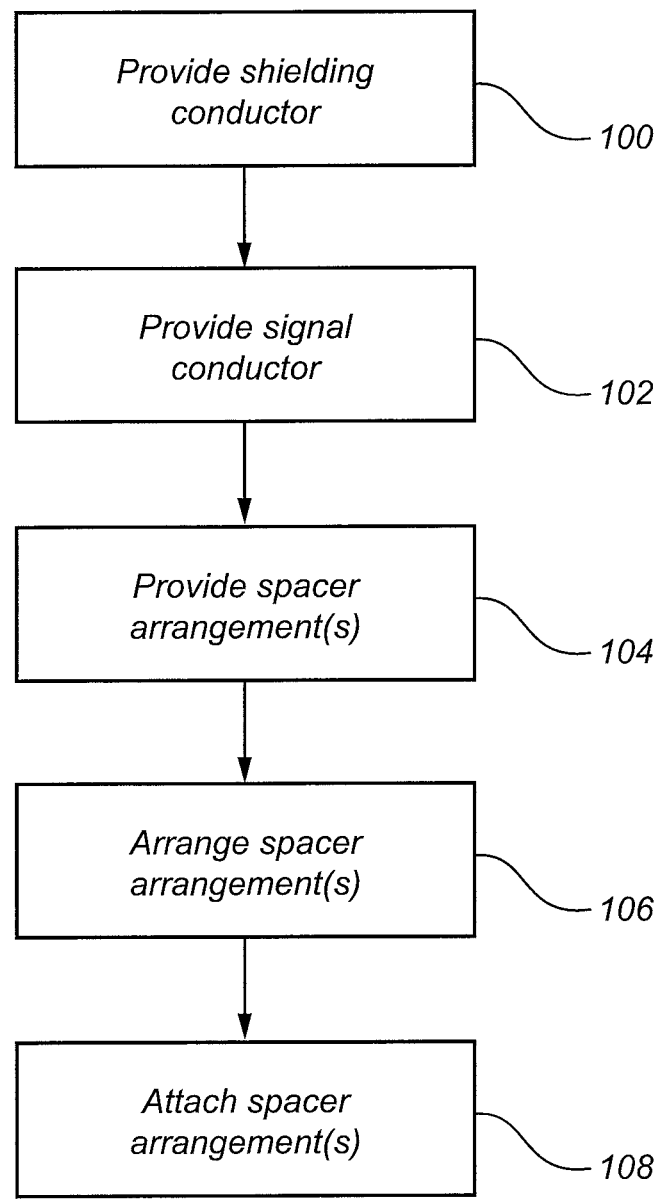
FIG. 9 is a flow-chart schematically illustrating an example embodiment of the method according to the present invention.

A method according to an example embodiment of the present invention will now be described with reference to the flow-chart in FIG. 9, and with additional reference to other figures as indicated.

In a first step 100, an elongated shielding conductor 51 is provided. As has been described further above with reference to FIG. 6A, the shielding conductor exhibits an elongated opening 53 along at least a portion of the shielding conductor 51.

In step 102, an elongated signal conductor 49 is provided. The signal conductor 49 is to be at least partly enclosed by the shielding conductor 51.

In step 104, at least one spacer arrangement 55a-c is provided, and in step 106, the at least one spacer arrangement is arranged between the signal conductor 49 and the shielding conductor 51 top prevent contact between the signal conductor 49 and the shielding conductor 51.

In the final step 108, the at least one spacer arrangement 55a-c is attached to the shielding conductor 51.

Figure 10:
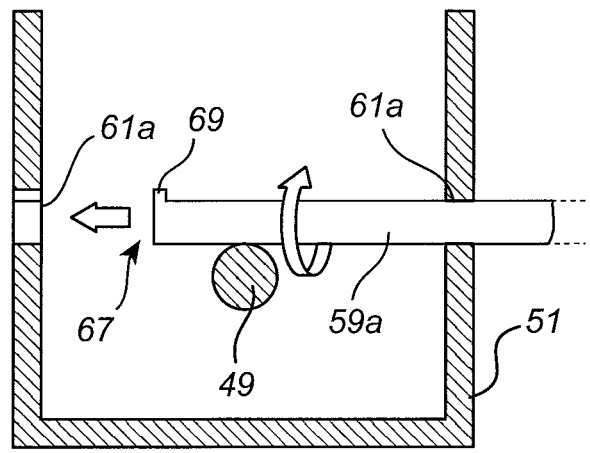
FIG. 10 schematically illustrates a first example of spacer member arrangement.

Referring first to FIG. 10, the step 106 of arranging the at least one spacer arrangement 55a-c and the step 108 of attaching the at least one spacer arrangement 55a-c to the shielding conductor 51 may, as was mentioned further above with reference to FIGS. 6A-C, involve axially inserting at least one spacer member 59a through through-going holes 61a in the shielding structure 51 and then rotating the spacer member 59a when fully inserted, to thereby axially lock the spacer member 59a by means of the radial protrusion 69 at the tip 67 of the spacer member 59a.

Figure 11:
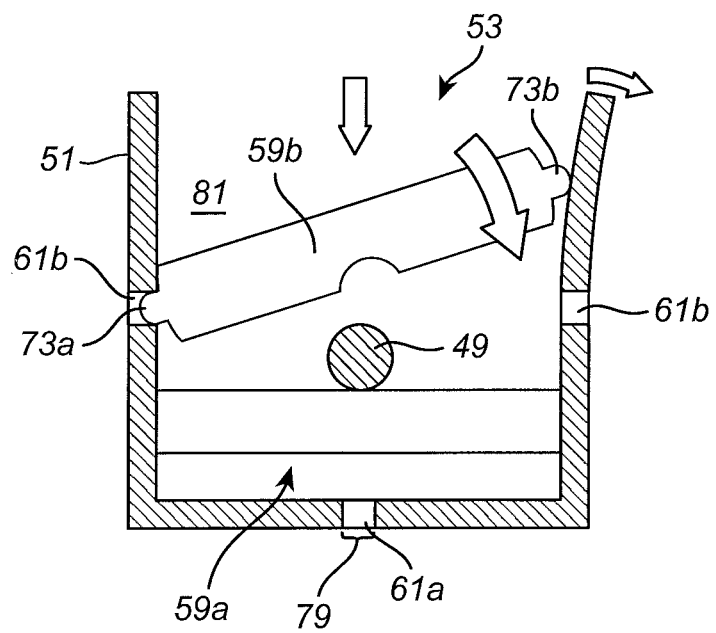
FIG. 11 schematically illustrates a second example of spacer member arrangement.

Turning now to FIG. 11, a first spacer member 59a with a first protrusion 79 is inserted into the space 81 defined by the shielding conductor 51 through the longitudinal opening 53 in the shielding conductor 51, and the first protrusion is received by a first recess 61a (such as a through-going hole) in the shielding conductor 51 to define the location of the first spacer member 59a inside the space 81 defined by the shielding conductor 51. It should be noted that the first spacer member 59a may be arranged before or after the signal conductor 49 is arranged in the space 81 defined by the shielding conductor 51.

Thereafter, a second spacer member 59b is inserted into the space 81 defined by the shielding conductor 51, with the first axial protrusion 73a of the second spacer member 59b first being received by a first one (the left one in FIG. 11) of the opening s 61b. Finally the second spacer member 59b is locked in place by elastically deforming the shielding conductor 51 as is schematically indicated in FIG. 11, pivoting the second spacer member 59 in place so that the second axial protrusion 73b can be received by a second one (the right one in FIG. 11) of the openings 61b, and allowing the shielding conductor 51 to flex back so that both openings 61b receive the first 73a and second 73b axial protrusions of the second spacer member 59b.

The person skilled in the art realizes that the present invention by no means is limited to the preferred embodiments described above. On the contrary, many modifications and variations are possible within the scope of the appended claims.

What is claimed is:

1. A radar level gauge system for determining a filling level of a product in a tank, said radar level gauge system comprising:

a transceiver for generating, transmitting and receiving electromagnetic signals;

an elongated two-conductor probe having a signal conductor connected to said transceiver, and a rigid shielding conductor spaced apart from said signal conductor by an open space, said two-conductor probe extending from an upper probe end to a lower probe end for guiding an electromagnetic transmit signal from said transceiver along said two-conductor probe towards and into said product in the tank, and for returning an electromagnetic surface echo signal resulting from reflection of said transmit signal at a surface of said product back towards said transceiver; and processing circuitry for determining said filling level based on said transmit signal and said surface echo signal, wherein said shielding conductor exhibits an open cross-section profile, in a cross-section with a plane perpendicular to said two-conductor probe, along at least a portion of said two-conductor probe, wherein said two-conductor probe further comprises a plurality of spacer arrangements arranged in spacer regions spaced apart along said two-conductor probe, each spacer arrangement in said plurality of spacer arrangements including at least a first spacer member attached to said rigid shielding conductor and arranged between said signal conductor and said rigid shielding conductor for preventing contact between said signal conductor and said shielding conductor, and wherein the at least first spacer member being attached to the rigid shielding conductor in such a way that movement of the at least first spacer member in relation to the rigid shielding conductor is restricted thereby.

2. The radar level gauge system according to claim 1, wherein said shielding conductor comprises at least a first spacer retaining structure in each of said spacer regions, said first spacer retaining structure being configured to co-operate with said first spacer member to attach said first spacer member to said shielding conductor in said spacer region.

3. The radar level gauge system according to claim 2, wherein said first spacer retaining structure comprises a recess, and said first spacer member is received by said recess.

4. The radar level gauge system according to claim 2, wherein said first spacer retaining structure comprises a protrusion, and said first spacer member comprises a recess receiving said protrusion.

5. The radar level gauge system according to claim 1, wherein each spacer arrangement in said plurality of spacer arrangements includes a second spacer member, different from said first spacer member, attached to said rigid shielding conductor and arranged between said signal conductor and said rigid shielding conductor for preventing, in co-operation with said first spacer member, contact between said signal conductor and said shielding conductor.

6. The radar level gauge system according to claim 5, wherein said shielding conductor comprises a first spacer retaining structure and a second spacer retaining structure in each of said spacer regions, said first spacer retaining structure being configured to co-operate with said first spacer member to attach said first spacer member to said shielding conductor in said spacer region, and said second spacer retaining structure being configured to co-operate with said second spacer member to attach said second spacer member to said shielding conductor in said spacer region.

7. The radar level gauge system according to claim 5, wherein said signal conductor is arranged between said first spacer member and said second spacer member.

8. The radar level gauge system according to claim 7, wherein:
said first spacer retaining structure comprises a recess, and said first spacer member is received by said recess; and
said second spacer retaining structure comprises a recess, and said second spacer member is received by said recess.

9. The radar level gauge system according to claim 7, wherein:
said first spacer retaining structure comprises a protrusion, and said first spacer member comprises a recess receiving said protrusion; and said second spacer retaining structure comprises a protrusion, and said second spacer member comprises a recess receiving said protrusion.

10. The radar level gauge system according to claim 1, wherein said shielding conductor surrounds said signal conductor by an enclosing arc angle around said signal conductor greater than 180° along said portion of said two-conductor probe.

11. The radar level gauge system according to claim 10, wherein said shielding conductor surrounds said signal conductor by an enclosing arc angle around said signal conductor smaller than 330° along said portion of said two-conductor probe.

12. The radar level gauge system according to claim 1, wherein the open cross-section profile of said shielding conductor is substantially uniform along said portion of said two-conductor probe, where said shielding conductor exhibits said open cross-section profile.

13. The radar level gauge system according to claim 1, wherein said portion of said two-conductor probe extends along at least one half of a distance between said upper probe end and said lower probe end.

14. The radar level gauge system according to claim 1, wherein a maximum lateral dimension of said shielding conductor is less than 5 cm.

15. A method for assembly of a two-conductor probe for a radar level gauge system, said method comprising the steps of:
providing an elongated shielding conductor exhibiting an elongated opening along at least a portion of said shielding conductor;
providing an elongated signal conductor to be at least partly enclosed by said shielding conductor;
providing at least one spacer arrangement;
arranging said at least one spacer arrangement between said signal conductor and said shielding conductor to prevent contact between said signal conductor and said shielding conductor; and
attaching said at least one spacer arrangement to said shielding conductor in such a way that movement of the at least one spacer arrangement in relation to the shielding conductor is restricted thereby.

16. The method according to claim 15, wherein:
said at least one spacer arrangement comprises at least a first spacer member; and
the step of arranging said at least one spacer arrangement comprises the step of:
inserting said at least first spacer member into said shielding conductor through the elongated opening in said shielding conductor.

* * * * *